United States Patent [19]

Tsunoda et al.

[11] Patent Number: 5,274,369
[45] Date of Patent: Dec. 28, 1993

[54] RADIO PAGING RECEIVER CONSUMING LESS ELECTRIC POWER

[75] Inventors: Kazuyuki Tsunoda; Kuniaki Kohga, both of Tokyo, Japan

[73] Assignee: NEC Corporation, Tokyo, Japan

[21] Appl. No.: 670,835

[22] Filed: Mar. 18, 1991

[30] Foreign Application Priority Data

Mar. 16, 1990 [JP] Japan ................. 2-66506

[51] Int. Cl.$^5$ .............................. H04B 7/00
[52] U.S. Cl. .............. 340/825.44; 455/38.3; 455/343
[58] Field of Search ............ 340/825.44, 825.47, 340/825.48, 311.1; 455/38.3, 228, 343

[56] References Cited

U.S. PATENT DOCUMENTS 4,952,927 8/1990 DeLuca et al. ............ 340/825.44

FOREIGN PATENT DOCUMENTS

2088604 6/1982 United Kingdom .

Primary Examiner—Donald J. Yusko
Assistant Examiner—J. Giust
Attorney, Agent, or Firm—Sughrue, Mion, Zinn Macpeak & Seas

[57] ABSTRACT

A radio paging receiver having a primary power source, and outputs boosted by DC—DC converters as its secondary power sources. The radio paging receiver is provided with a first DC—DC converter which operates all the time or while the power source is on and a second DC—DC converter which operates intermittently to be active only when the load current is greater. The first DC—DC converter is so set as to be higher in source efficiency under light load and the second, as to normally operate even under heavy load. The first DC—DC converter supplies power to the circuits including a decoder in all the modes including the standby mode and the battery saving mode, both imposing only a light load. The second DC—DC converter intermittently operates to be active only in the heavy-load message data processing and message display modes, and supplies power to a CPU and an LCD signal processor in these modes. The voltages of the first and second DC—DC converters may be different from each other and, if they are, the output of the first DC—DC converter is supplied only to less loaded circuits.

43 Claims, 4 Drawing Sheets

| CIRCUIT \ MODE | SB | RX | MP | MD | SO |
|---|---|---|---|---|---|
| DECODER 4 | ▨ | ▨ | ▨ | ▨ | ▨ |
| RADIO SECTION 5 | | ▨ | | | |
| PULSE SHAPING CKT 6 | | ▨ | | | |
| CPU 9 | | | ▨ | ▨ | ▨ |
| LCD SIGNAL PROC. 11 | | | | ▨ | ▨ |
| AMP 13 | | | | | ▨ |
| DC/DC CONVERTER 3 | ▨ | ▨ | ▨ | ▨ | ▨ |
| DC/DC CONVERTER 10 | | | ▨ | ▨ | ▨ |

▨ OPERATING

RADIO PAGING RECEIVER CONSUMING LESS ELECTRIC POWER

BACKGROUND OF THE INVENTION

The present invention relates to a radio paging receiver and, more particularly, to a radio paging receiver consuming less electric power.

Radio paging receivers in recent radio paging systems usually have such call notifying functions as visual message displaying in addition to alerting by audible tones. In a radio paging receiver having such call notifying functions, first the radio section receives and demodulates a paging signal sent from a base station of a paging system to which the receiver belongs. Then, a pulse shaping circuit shapes the waveform of the demodulated paging signal. The pulse-shaped paging signal is decoded by a decoder, which, if it finds the decoded call number identical with the call number of the receiver stored in a programmable read-only memory (PROM), supplies the decoded message signal to a central processing unit (CPU). The CPU subjects the message signal to such processing as error detection and error correction, and supplies call notifying means with message data resulting from the processing of the message signal. The call notifying means, which notifies the user of a call, has a message display unit for displaying the message data and an audible sound alerting unit for generating alerting sounds, and the CPU gives an instruction to operate either unit or both units of the call notifying means as preset by the user.

For such a radio paging receiver, battery saving, i.e. reducing the consumption of the battery power, is an important requirement. For this reason, a conventional radio paging receiver receives a paging signal not constantly but only intermittently to save the battery power. For instance in a standby (SB) mode which accounts for a predominant part of the total period of use, the radio paging receiver keeps in operation only its decoder, but receives no paging signal. In a receiving (RX) mode which makes a part of the total period of use, the radio section, pulse shaping circuit and decoder are operated to receive and decode a paging signal. In message processing (MP) and message display (MD) modes, in which the receiver is placed only a few times a day, the decoder, CPU and call notifying means are operated, but the power supply to the radio section and pulse shaping circuit is cut off. Thus, the radio paging receiver saves its battery power by keeping in operation only the minimum required circuits.

The radio paging receiver makes available several source voltages to operate its circuits. For instance, one manganese battery, generating a voltage of about 1 volt or more, is used as the power source for the radio section, pulse shaping circuit and audible sound alerting unit, and a secondary power source, whose output is about 5 volts deriving from the manganese battery by a DC—DC converter, is used to supply power to the decoder, CPU and message display unit.

In the above described conventional radio paging receiver, only one DC—DC converter is used as the secondary power source in every operating mode of the receiver. The efficiency of a DC—DC converter, however, varies with the amperage of the load current. For instance, a usual DC—DC converter switches a DC with a transistor and boosts the switched DC with an inductor. However, there is a problem that, where a large-capacity switching transistor is used for the switching purpose, the conversion efficiency of the DC—DC converter drops if the load current is small. Meanwhile there is another problem that, where a small-capacity switching transistor is used, the output voltage of the DC—DC converter drops below the required level if the load current is great.

In an example of radio paging receiver, while the required current of the decoder operating in the SB mode is about 0.2 mA, that of the 5 volts power supply in the MD mode is around 9 mA. Therefore, the DC—DC converter is required to be capable of supplying 9 mA at an output voltage (usually $\pm 10\%$ of the rated voltage) within a prescribed range. However, since the power supply efficiency of a DC—DC converter having such a capacity markedly drops at the output current of 0.2 mA, the exhaustion of the battery in the SB mode, which accounts for a major part of the total period of operation, is increased, resulting in a reduced useful life of the battery. As a result, not only does the battery cost of the radio paging receiver increase, but also has the battery to be replaced frequently.

SUMMARY OF THE INVENTION

A first object of the present invention, therefore, is to provide a radio paging receiver capable of keeping its battery useful for a longer period.

A second object of the invention is to provide a radio paging receiver needing the battery replacement less frequently.

A radio paging receiver according to the present invention is in the SB mode either always or when the power switch is on, and its reception of a paging signal transmitted from the radio apparatus of the base station of the radio paging system is suspended then. In the BS mode, the radio section receives and demodulates a paging signal. A wave-shaping circuit shapes the pulse of the demodulated paging signal, and sends it to a decoder. The decoder decodes the pulse-shaped paging signal and, if it finds the decoded call number signal identical with the call number of the receiver stored in a PROM, outputs a message signal to a CPU. Upon outputting of the message signal, the radio paging receiver shifts to the MP mode. The CPU, in the MP mode, subjects the message signal to such processing as error detection and error correction, and supplies call notifying means with message data resulting from the processing of the message signal. Then the radio paging receiver shifts to the MD mode, and the CPU gives an instruction to make the call notifying means display the message or otherwise perform call notification as preset in the radio paging receiver.

The radio paging receiver performs battery saving by receiving a paging signal only intermittently and limiting the circuits to be operated while in a given operating mode. For instance in the RX mode, the radio paging receiver keeps in action only the decoder, but receives no paging signal. In the RX mode, the radio section, pulse shaping circuit and decoder are operated to receive and decode a paging signal. In the MP and MD modes, the decoder, CPU and call notifying means are operated, but the power supply to the radio section and pulse shaping circuit is cut off. Thus, the radio paging receiver saves its battery power by keeping in action only the minimum required circuits.

The radio paging receiver according to the present invention has, besides a primary power source which is a battery, at least two DC—DC converters as secondary power sources. A smaller-capacity unit is used as the first, and a larger-capacity one as the second, DC—DC converter, and both convert the battery voltage to a prescribed voltage or voltages. Each circuit of the radio paging receiver is supplied with electric power suitable for it from either the primary or secondary power source. The choice of the first or the second DC—DC converter as the power source for a circuit to be supplied with power from a secondary power source is determined according to the operating mode. For instance, when the load is light as in the SB mode, the operating circuit is supplied with power from the smaller-capacity first DC—DC converter, or when the load is heavy as in the MD mode, the operating circuit receives power supply not only from the first DC—DC converter but also from the second DC—DC converter. A circuit operating when the load is heavy may be supplied with power only from the second DC—DC converter.

In a first preferred embodiment of the invention, the output voltages of the first and second DC—DC converters are equal, though the first DC—DC converter is set to be suitable for a light load and the second, for a heavy load. The first DC—DC converter is operating either always or when the power switch is on. The second DC—DC converter, though connected in parallel with the first, operates only when the load is heavy, but at no other time.

In a second preferred embodiment of the invention, the output voltages of the first and second DC—DC converters are unequal. The first DC—DC converter, assigned as the power source for circuits operating under a light load, is active either always or when the power switch is on. The second DC—DC converter, assigned as the power source for circuits operating under a heavy load, is active only when the heavy load circuits are operating, supplying them with power at a higher output voltage than that of the first DC—DC converter.

In a third preferred embodiment of the invention, a third DC—DC converter is used for circuits which require a different source voltage. The third DC—DC converter converts the output voltages of the first and second DC—DC converters, connected in parallel, into a required voltage. This power source composition helps to make the configuration of the third DC—DC converter simpler than it would be if the input voltage to the third DC—DC converter were to be directly taken from the output of the battery.

BRIEF DESCRIPTION OF THE DRAWINGS

The above-mentioned and other objects, features and advantages of the present invention will become more apparent by referring to the following detailed description of the invention taken in conjunction with the accompanying drawings, wherein.

DETAILED DESCRIPTION OF THE PREFERRED EMBODIMENTS

Figure 1:
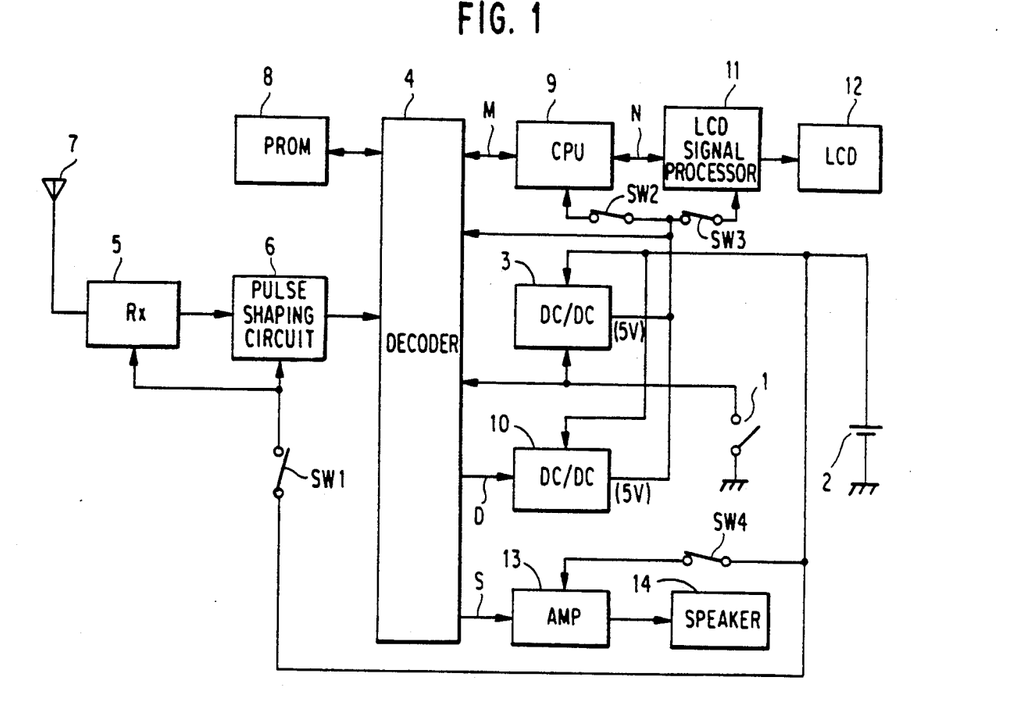
FIG. 1 is a block diagram of a radio paging receiver according to a first preferred embodiment of the invention.

Referring to FIG. 1, a radio paging receiver includes a power switch 1. When the power switch 1 is closed, a DC—DC converter 3 connected to a battery 2 of 1.5 volts is turned on. The voltage-boosted output of DC—DC converter 3 activates a decoder 4 to put the receiver into a standby (SB) mode. When the receiver has been in the SB mode for a prescribed length of time, the decoder 4 closes a first switch SW1 to activate a radio section 5 and a pulse shaping circuit 6. This shifts the receiver to a receiving (RX) mode.

In the RX mode, the radio section 5 receives through an antenna 7 a radio paging signal, which is supposed to be a digital radio signal, transmitted from a base station (not shown) of a radio paging system to which the receiver belongs. The paging signal contains a call number signal for calling the radio paging receiver and a message signal following the call number signal. The radio section 5 further amplifies and demodulates the received paging signal to produce a baseband signal. The pulse shaping circuit 6 pulse-shapes the baseband signal and supplies the shaped signal to the decoder 4. The decoder 4 decodes the shaped signal to produce a decoded call number signal and message signal. The decoder 4 then checks if the decoded call number signal is identical with a call number stored in advance in a programmable read-only memory (PROM) 8.

If the decoded call number signal is found identical with the stored call number, the decoder 4 supplies the decoded message signal M to a CPU 9 and at the same time generates an activating signal D and supplies it to a DC—DC converter 10. In response, the DC—DC converter 10 starts boosting the output voltage (1.5 V) of battery 2 to generate a 5 volts voltage. This activation of DC—DC converter causes the radio paging receiver to shift to a message processing (MP) mode.

In the MP mode, the decoder 4, while turning off the first switch SW1 to stop the operation of the radio section 5 and the pulse shaping circuit 6, turns on a second switch SW2 to activate the CPU 9 by providing it with 5 volts output voltages from the two DC—DC converters 3 and 10. The decoder 4 and the CPU 9, provided with the output voltages from the DC—DC converters 3 and 10, subjects the message signal M to such processing as error detection and error correction, and then supplies a liquid crystal display (LCD) signal processor section 11 with message data N obtained by processing the message signal M.

Then the radio paging receiver shifts to a message display (MD) mode, and the decoder 4 further turns on a third switch SW3 to provide the output voltages from the two DC—DC converters 3 and 10 to the LCD signal processor 11 and thereby to make the LCD signal processor 11 start operating. The LCD signal processor 11 makes an LCD unit 12 display the message data. If a sound notifying instruction is preset in the radio paging receiver, the receiver is put into a sound (SO) mode to perform an optional alternative to the MD mode. In the SO mode, the CPU 9 provides a sound notifying instruction to the decoder 4. Responsive to the instruction, the decoder 4 turns on a fourth switch SW4 to give the 1.5 volts output voltage of the battery 2 to an amplifier 13 to enable it to operate. Then the decoder 4 supplies a sounding signal S to the amplifier 13 which in turn drives a loud speaker 14 to generate alerting sounds. Here the LCD signal processor 11 and the LCD unit 12 may constitute the message display unit of the call notifying means, and the amplifier 13 and the loud speaker 14 may make up the sound notifying unit.

Upon termination of the MD mode or the SO mode, the decoder 4 ceases supplying the activating signal D to stop the operation of the DC—DC converter 10 and, at the same time, turns off the switches SW1, SW2, SW3 and SW4, so that the radio paging receiver returns to the SB mode, in which power is supplied to the decoder 4 alone.

The battery 2, which may be a manganese battery or the like, is the primary power source of the radio paging receiver. The 1.5-volts output voltage of the battery 2 is supplied via the switches SW1 and SW4 to the radio section 5 and the pulse shaping circuit 6 and the amplifier 13, respectively, and also supplied directly to the DC—DC converters 3 and 10, which are secondary power sources. When the power switch 1 is manually turned on, the DC—DC converter 3 starts operating. The DC—DC converter 3 supplies its 5-volts output voltage to the decoder 4, and also to the CPU 9 and the LCD signal processor 11 via the switches SW2 and SW3, respectively. The DC—DC converter 3 has a small capacity, i.e., consumes a smaller current. The DC—DC converter 10 is actuated by the activating signal, or operation command D from the decoder 4. The DC—DC converter 10 generates a 5 volts output voltage, equal to that of the DC—DC converter 3, and operates in parallel with the DC—DC converter 3 when the operation command D is supplied. The DC—DC converter 10 has a capacity larger than that of DC—DC converter 3. Between the output terminals of the DC—DC converters 3 and 10 may be connected a reverse current preventive circuit, such as a diode, so that no reverse current may flow between them. Here the DC—DC converter 3 is a power source which is efficient under a light load, while the DC—DC converter 10, one from which a large current is available.

The FIG. 1 receiver receives a paging signal transmitted in a frame which lasts about 30 seconds and includes fifteen (15) subframes. After synchronizing with the frame, the receiver is operable during only one of the 15 subframes to which the receiver is assigned. Since the receiver, as stated above, has four operating modes; the SB, RX, MP and MD, or SO, modes, the SB mode accounts for almost 14/15 of the total operating time, and the RX mode, close to 1/15. The receiver is in the MP and MD modes only a few times a day, for a few seconds and 20 seconds, respectively, at a time. As mentioned above, the power supply to each circuit is selected by turning on or off the power switch 1 and the switches SW1, SW2, SW3 or SW4 according to the operating mode. When the load is light as in the SB mode, in which only the decoder 4 is operating, the decoder 4 is supplied with power only from the smaller-capacity DC—DC converter 3. When the load is heavy, as in the MP or MD mode, in which more circuits, including 4, 6 and 7, are operating, those circuits, decoder 4, CPU 9 and LCD signal processor 11 receive power supply from both DC—DC converters 3 and 10.

Thus, the DC—DC converter 3 is used in every operating mode while the DC—DC converter 10 is used only under a heavy load. Therefore, the consumption of power from the battery can be reduced because only the DC—DC converter 3, which is more efficient under a light load, is used in the light-load mode which accounts for a predominant part of the total period of use. Meanwhile, under a heavy load which arises only for a short period of time, the larger-capacity DC—DC converter 10 is operated to meet the power requirement of every circuit.

Figure 2:
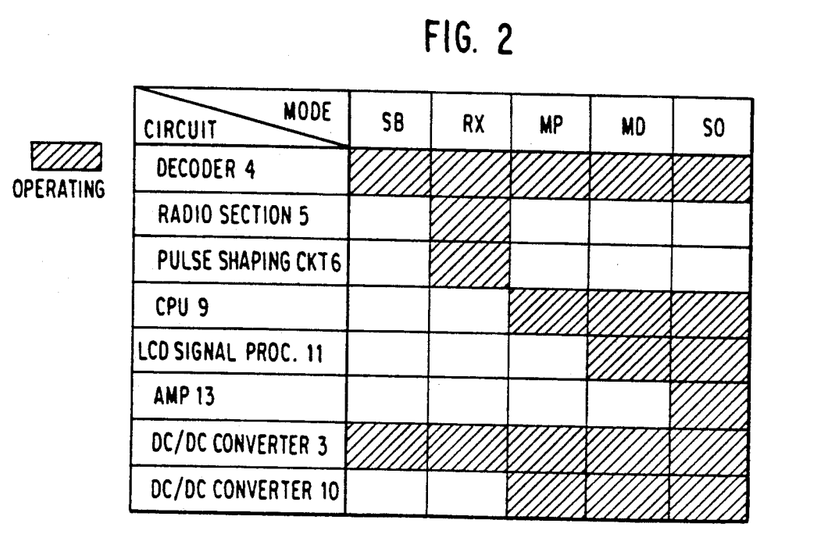
FIG. 2 is a graph illustrating a typical set of modes in which the circuits constituting the radio paging receiver of FIG. 1 operate.

Referring now to FIG. 2, the operating states of the circuits 3, 4, 5, 6, 9, 10, 11 and 13 are shown with respect to the SB, RX, MP, MD and SO modes. The decoder 4 and the DC—DC converter 3 are operating during the total period of use.

In the SB mode, which accounts for almost 14/15 of the total operating time, the decoder 4 receives power supply from the DC—DC converter 3, and is engaged in standby operations including the time counting.

Reception of a paging signal takes place in the RX mode, which makes up nearly 1/15 of the total operating time. During this process, a paging signal is received and pulse shaped by the radio section 5 and the pulse shaping circuit 6, and decoded by the decoder 4. The radio section 5 and the pulse shaping circuit 6 receive power from the battery 2 via the switch SW1, and the decoder 4 does so from the DC—DC converter 3. In the aforementioned SB and RX modes which are periodically repeated, the decoder 4 is operating in a low-speed mode, in which its power consumption is smaller.

In the RX mode, if the decoded call number signal is found identical with the call number of the ratio paging receiver stored in the PROM 8, the receiver shifts to operations in the MP mode. The CPU 9 subjects the message signal M to such processing as error detection and error correction. At this time, the decoder 4 is in a high-speed mode, in which its power consumption is greater. As the CPU 9 also operates, the load becomes heavier, necessitating the actuation of the DC—DC converter 10 as well. The actuation of the DC—DC converter 10 is achieved by the simultaneous supply of the operation command from the decoder 4 to the DC—DC converter 10 as the decision by the decoder 4 to shift to the MP mode. The radio section 5 and the pulse shaping circuit 6 operate only in the RX mode, and are turned off in the other modes.

After the message processing by the CPU 9 is achieved, the radio paging receiver shifts to the MD mode for call notification or to the SO mode to be described afterwards. The message data N obtained as a result of message processing in the MP mode are supplied from the CPU 9 to the LCD signal processor 11, which causes the message data to be displayed on the LCD unit 12. The additional circuit to which power is supplied from the DC—DC converters 3 and 10 in the MD mode is the LCD signal processor 11.

If a sound alerting instruction is preset in the radio paging receiver as an optional alternative to the MD mode, the radio paging receiver shifts to the SO mode. In this case, the CPU 9 supplies the sound alerting instruction to the decoder 4 at the same time as the supply of the message data N to the LCD signal processor 11. The decoder 4 then supplies a sounding signal S to the amplifier 13. The loud speaker 14, driven by the amplifier 13, issues call sounds. In this mode, the amplifier 13 receives power from the battery 2.

When the operations in the MD or SO mode are completed, the radio paging receiver returns to the SB mode.

Figure 3:
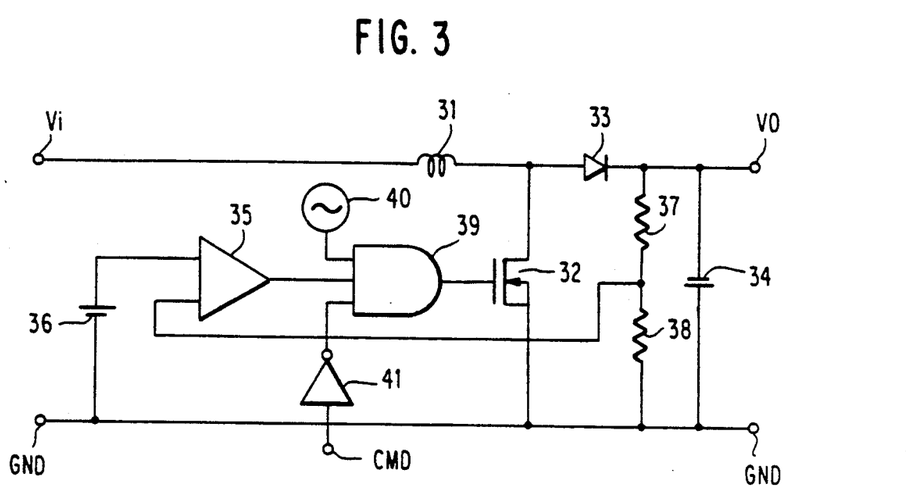
FIG. 3 is a block diagram of an example of the DC—DC converter in the FIG. 1 receiver.

Table 1 lists the power consumptions by the circuits which, out of those illustrated in FIG. 1, are involves in the processing of message signals. The circuits operating on a source voltage of 5 volts, which has to be supplied from the DC—DC converter or converters are the decoder 4, CPU 9 and LCD signal processor 11. As the decoder 4 is used in every mode, reducing its power consumption is a vital factor in battery saving. The decoder 4 operates, when in the SB or RX mode, in a low-speed mode requiring a current of 0.2 mA and, when in the MP or MD including SO mode, in a high-speed mode requiring a current of 2 mA. Therefore, the combined minimum output current of the DC—DC converters 3 and 10 is 0.2 mA, and they together need a capacity to supply a combined maximum output current of 9 mA including 5 mA for the CPU 9 and 2 mA for the LCD signal processor 11. The minimum current should be supplied all the time, while the maximum current need not be supplied for any more than 30 seconds at a time. The 5 volts power supply in the radio paging receiver illustrated in FIG. 1 is supplied from the DC—DC converter 3 in the SB or RX mode, when the current requirement is at its minimum, and from the two DC—DC converters 3 and 10 in the MP or MD mode. The radio section 5, the pulse shaping circuit 3 and the amplifier 13 receive power from the battery 2.

capacitor 34 is connected between the Vo terminal and the output GND terminal.

A comparator 35 compares a reference voltage supplied from a battery 36 and a voltage at the conjunction of voltage dividing resistors 37 and 38 connected in series between the Vo and GND terminals, and outputs a logical value "1" when the voltage at the conjunction is lower. The resistances of the voltage dividing resistors 37 and 38 are so selected that the voltage at the conjunction be equal to the reference voltage when the output voltage at the Vo terminal is at a prescribed level. A three-input AND gate is used as an AND gate 39, whose inputs are a clock signal from a clock signal generator 40, which may consist of a quartz oscillator, and the operation command entered from a CMD terminal via an inverter 41, and whose output is inputted to the gate of the MOS transistor 32.

The MOS transistor 32 switches the input current only while the output voltage at the Vo terminal is below a predetermined level. More specifically, the MOS transistor 32 is conductive while the output voltage at the Vo terminal is below the predetermined level, the clock signal is "1" in logical value and the operation command is "0" in logical value. Thus, only while the

TABLE

Power Consumptions of Individual Circuits

| Name of circuit | Operating current When not in operation | Operating current When in operation | Source voltage | Operating time | Operating mode |
|---|---|---|---|---|---|
| Radio section 5 Pulse shaping 6 circuit | 0 | 3 mA | 1.5 V | about 1/15 of total operating time | RX |
| Decoder 4 | — | 0.2 mA[1] (2 mA) | 5.0 V | All the time | All modes |
| CPU 9 | 0 | 5 mA | 5.0 V | A few times/day (20 + a few sec.) | MP, MD |
| LCD signal 11 processor | 0 | 2 mA | 5.0 V | A few times/day (20 sec./time) | MD |
| Amplifier 13 | 0 | 80 mA | 1.5 V | A few times/day (20 sec./time) | MD |

Note
[1] 0.2 mA is required in the SB and RX modes, and 2 mA, in the MP and MD modes.

FIG. 3 is a circuit diagram of a separately excited DC—DC converter suitable for the DC—DC converters 3 and 10 shown in FIG. 1.

A Vi terminal and a GND terminal are supposed to be DC input terminals, and a Vo terminal and another GND terminal, output terminals for the voltage-converted, or boosted, DC. To the Vi terminal is connected one end of an inductor 31. An MOS transistor 32, of which the drain is connected to the other end of the inductor 31 and the source, to the GND terminals, switches the DC entered from the second mentioned end of the inductor 31. The DC supplied from the Vi terminal is boosted at the second mentioned end of the inductor 31 by being switched, or chopped, by the MOS transistor 32. Thus, when the MOS transistor 32 is rendered conductive, energy is stored in the inductor 31, and when the MOS transistor 32 is not conductive, the DC energy stored in the inductor 31 is boosted. The DC boosted by the inductor 31 passes a reverse current preventive diode 33 and is supplied to the Vo terminal. The DC supplied to the Vo terminal is charged and smoothed by a capacitor 34. The anode of the diode 33 is connected to the second mentioned end of the inductor 31, and the cathode of same, to the Vo terminal. The output voltage is below the prescribed level, the MOS transistor 32 performs switching to supplement and thereby stabilize the output voltage.

Where this DC—DC converter is used as the DC—DC converter 3 shown in FIG. 1, the CMD terminal is grounded by the turning-on of the power switch 1 to let a logical value of "0" be entered to start voltage conversion. Where it is used as the DC—DC converter 10, the operation command or activating signal D of "0" in logical value is inputted to the CMD terminal from the decoder 4. Therefore, the DC—DC converter 10 can switch the MOS transistor 32, i.e. can provide a voltage-converted DC output, only during the continuation of the operation command D which holds the "0" level from the starting point of the MP mode till the ending point of the MD or SO mode.

Figure 4:
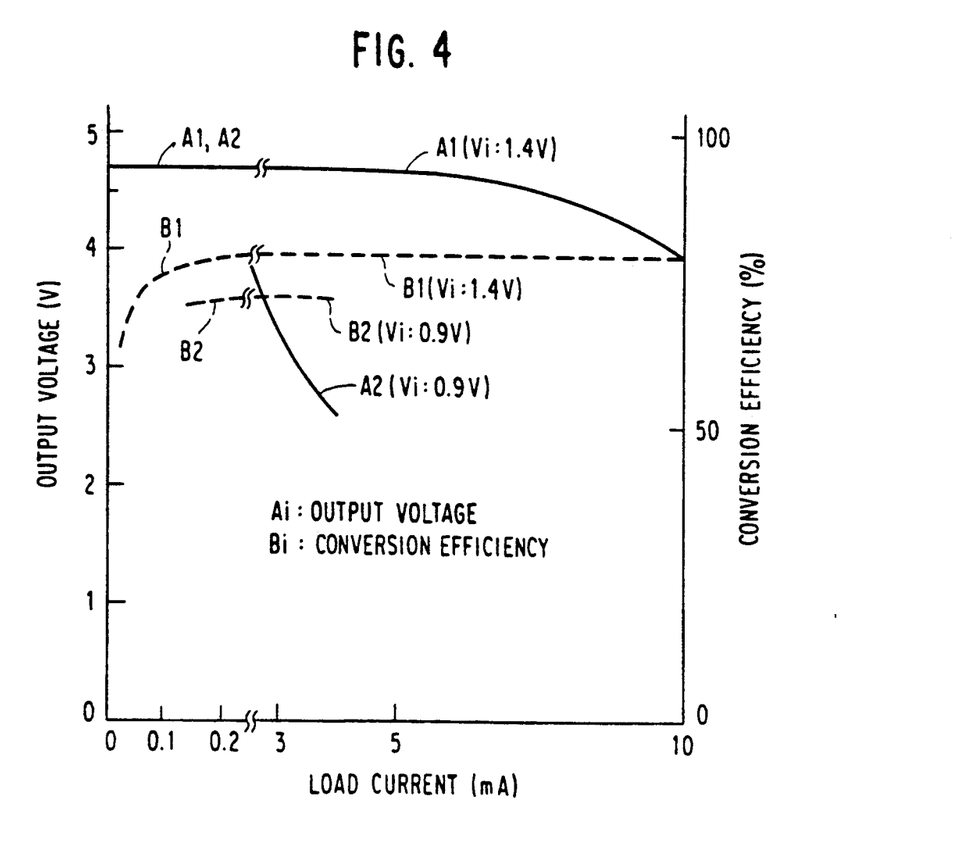
FIG. 4 illustrates an example of the operating characteristics of the DC—DC converter shown in FIG. 3.

Now will be described the power source efficiency for the load current and the characteristics of the output voltage in the example of DC—DC converter illustrated in FIG. 3.

This DC—DC converter is for use under light load. In its standard state, the input voltage Vi is set at 1.4 volts, and the output voltage A1, at 4.7 volts. Even when the load is as light as 0.2 mA in load current, the source efficiency B1 is 78%, which is sufficiently high.

When the load is as heavy as 9 mA in load current, the output voltage A1 drops to 4.4 volts though the source efficiency B1 is still sufficiently high. This state prevents the digital signal handling load circuits, including the CPU 9, whose rated source voltage is 5.0 volts ±10% from normally operating. Especially when the input voltage Vi is 0.9 volt, close to its limit point, although the output voltage A2 is sufficiently high when the load current is 0.2 mA, the output voltage A2 extremely drops when the load current is 9 mA. A large load current can be obtained by increasing the current capacity of the MOS transistor 32 shown in FIG. 3, but then the idle current under light load would increase, inviting a drop in source efficiency under light load. Thus, where the load current varies over a wide range, it is difficult to obtain a secondary power source which can be efficient for both the light and heavy loads by using only one DC—DC converter. However, by arranging the DC—DC converter 3 for use under light load and the DC—DC converter 10 for use under heavy load and using the two DC—DC converters 3 and 10 selectively according to the operating mode as in the embodiment illustrated in FIG. 1, the consumption of the power from the battery 2 in the radio paging receiver can be reduced.

Figure 5:
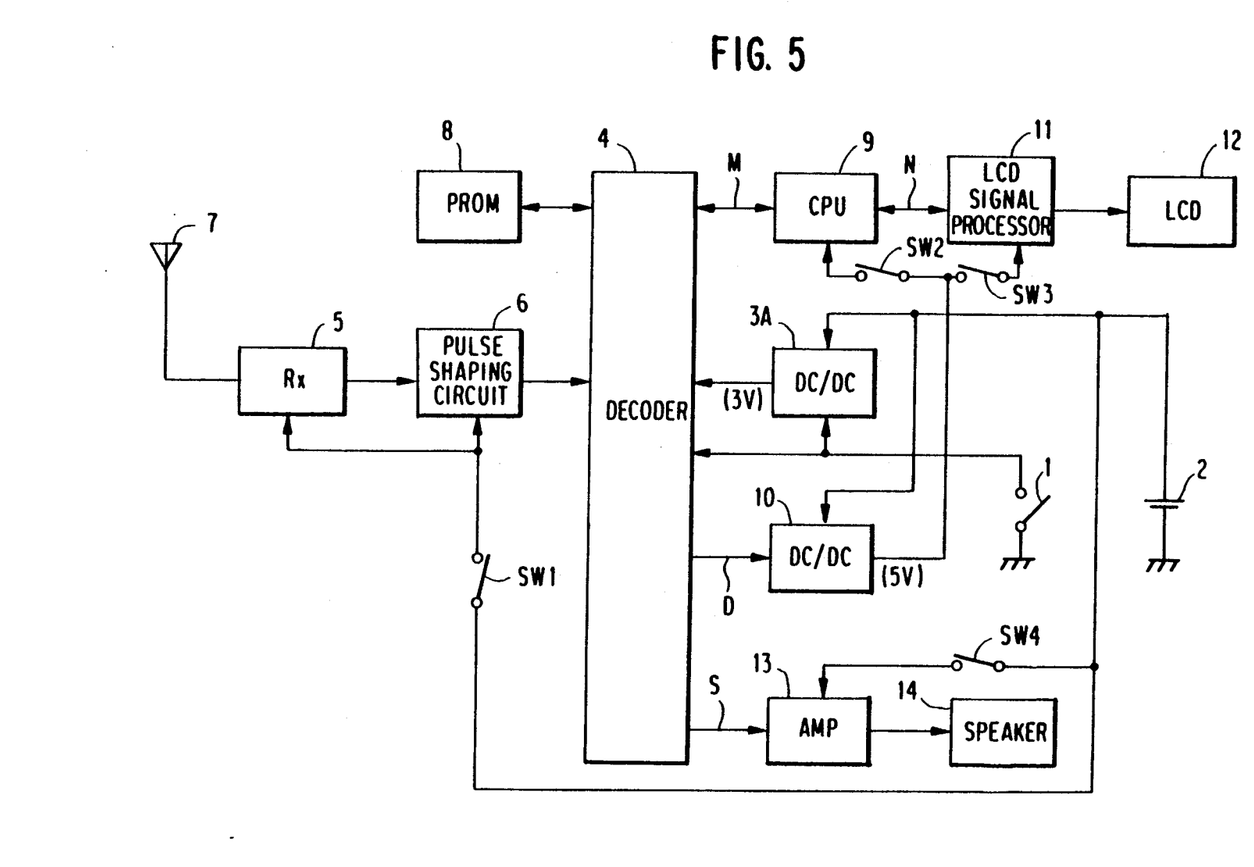
FIG. 5 is a block diagram of a second preferred embodiment of the invention.

Referring to FIG. 5, a second preferred embodiment of the present invention uses, in place of the DC—DC converter 3 with an output of 5 volts in the embodiment illustrated in FIG. 1, a DC—DC converter 3A with an output of 3 volts, whose output is supplied to a decoder 4 alone. A DC—DC converter 10 with an output of 5 volts does not supply power to the decoder 4. In all other respects, this embodiment has the same configuration and operates in the same manner as the first embodiment of FIG. 1. This second embodiment has been made possible to realize by the ability of the decoder 4 to operate at a source voltage of 3 volts, lower than the source voltage for other circuits. By lowering the source voltage supplied from the DC—DC converter 3A to the decoder 4, a greater saving can be achieved in the consumption of power in the SB and RX modes in which the radio paging receiver operates most of the time. Thus in the second embodiment, the DC—DC converters 3A and 10 have different output voltages.

Figure 6:
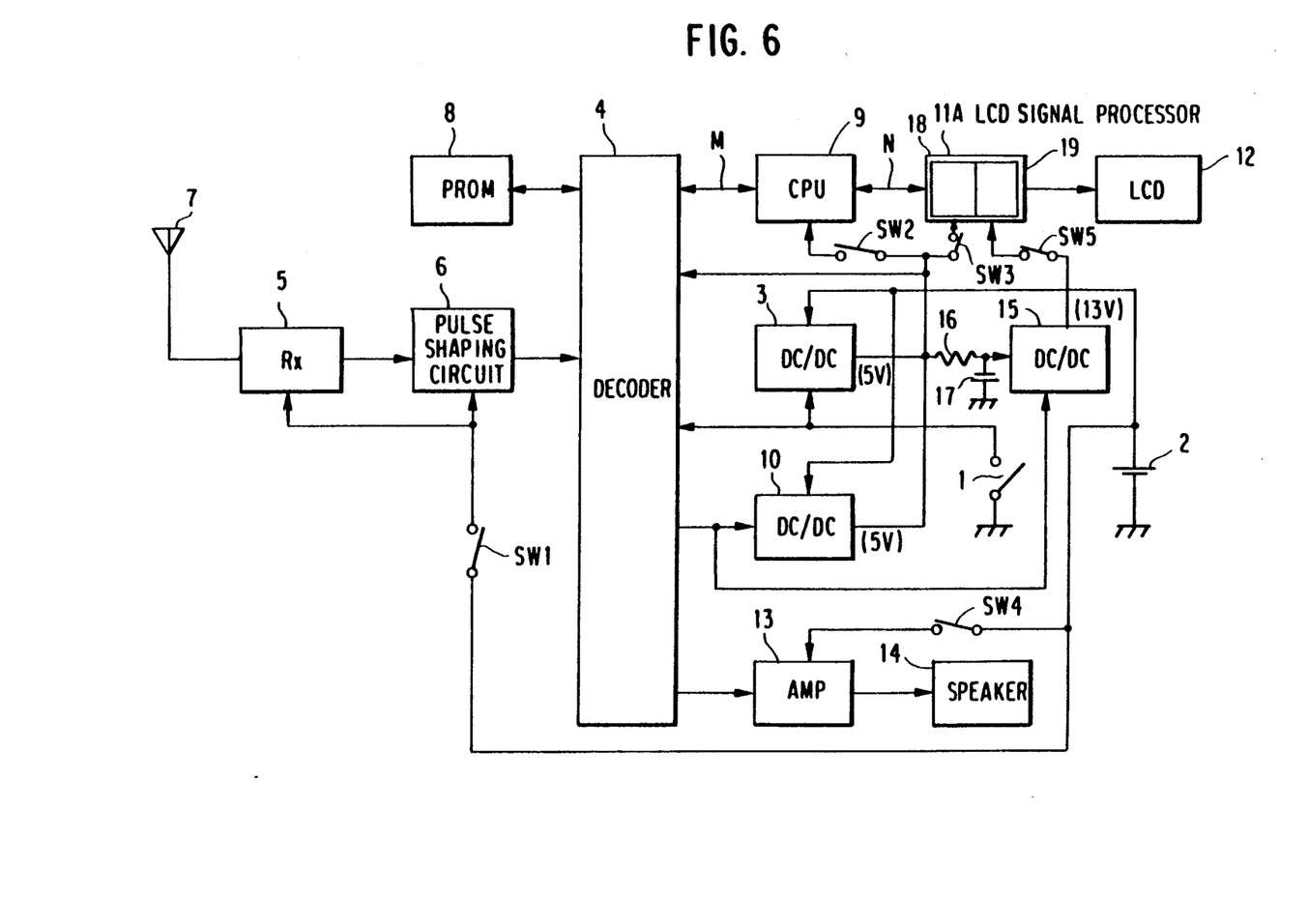
FIG. 6 is a block diagram of a third preferred embodiment of the invention.

Referring now to FIG. 6, a third preferred embodiment of the present invention has a DC—DC converter 15 into which the output voltages of the DC—DC converters 3 and 10 in the embodiment illustrated in FIG. 1 are applied and which boosts those voltages from 5 volts to 13 volts. The output of the DC—DC converter 15 is used by an LCD driver 19 of an LCD signal processor 11A as the power source for driving an LCD unit 12. The LCD signal processor 11A comprises a signal processor 18 for processing a digital signal, or message data, N entered from a CPU 9 and the LCD driver 19 for driving the LCD unit 12 to display the message data. The LCD unit 12, though adequately operating on a voltage of 5 volts in displaying at low speed, requires a high operating voltage when high-speed displaying should be performed. for this reason, the 5 volts output voltages of the DC—DC converters 3 and 10 are supplied to the signal processor 18 via a switch SW3, and the 13 volts output of the DC—DC converter 15 is supplied to the LCD driver 19 via a switch SW5, which is turned on and off simultaneously with the switch SW3 under the control of decoder 4.

In the preferred embodiment illustrated in FIG. 6, since the outputs of the DC—DC converters 3 and 15 are applied to the DC—DC converter 15, the DC—DC converter 15 can dispense with a voltage stabilizing circuit which is otherwise required in an arrangement in which the output of battery 2 is directly applied to the DC—DC converter 15. This simplifies the circuitry of the receiver as a whole. Thus, a third DC—DC converter, the DC—DC converter 15 in this case, can satisfy the functions required by a given radio paging receiver while simplifying the receiver's circuitry.

A resistor 16 is connected between the outputs of the DC—DC converters 3 and 10 and the input of the DC—DC converter 15, and a capacitor 17, between the input of the DC—DC converter 15 and ground, both to limit the input current to the DC—DC converter 15. This current limiting circuit prevents changes in the output voltages of the DC—DC converters 3 and 10, which might otherwise arise from an abrupt current inflow to the DC—DC converter 15. Undesirable operations of the radio paging receiver due to source voltage fluctuations can thereby be avoided.

Although the invention has been described with reference to the specific embodiments, this description is not meant to be construed in a limiting sense. Various modifications of the disclosed embodiments, as well as other embodiments of the invention, will become apparent to persons skilled in the art upon reference to the description of the invention. It is therefore contemplated that the appended claims will cover such modifications or embodiments as fall within the true scope of the invention.

What is claimed is:

1. A radio paging receiver comprising:
   means for receiving a paging signal containing a call number signal and a message signal;
   means for decoding said paging signal to produce a decoded call number and message signal;
   means for storing a call number assigned to said radio paging receiver;
   comparison means for comparing said decoded call number with the stored call number and supplying an alert signal when said decoded call number is found identical with said stored call number;
   display means for displaying a message signal;
   control means responsive to said alert signal for causing said display means to display said decoded message signal;
   first DC—DC converter means for continuously supplying its DC output to said decoding means; and
   second DC—DC converter means for periodically supplying its DC output to said control means.

2. A radio paging receiver as claimed in claim 1, said receiver has at least standby and receiving modes, and wherein only said decoding means is operable in said standby mode, and wherein at least said receiving means is operable in said receiving mode.

3. A radio receiver as claimed in claim 2, wherein said first DC—DC converter means supplies power to said decoding means and said comparison means in said standby and receiving modes.

4. A radio paging receiver as claimed in claim 1, wherein said receiver has a message processing mode in which said control means processes said message signal and a message display mode in which said control means makes said display means display the processed message signal, wherein said second DC—DC converter operates in said message processing and display modes but in no other mode.

5. A radio paging receiver as claimed in claim 4, wherein said comparison means comprises means for activating said second DC—DC converter means in response to the start of said message processing mode.

6. A radio paging receiver as claimed in claim 1, wherein said control means comprises CPU means for extracting message data from said decoded message signal; and signal processor means for processing said message data and supplying the processed message data to said display means, and wherein said second DC—DC converter supplies power to said CPU means in said message processing and display modes and supplies power to said signal processor means in said message display mode.

7. A radio paging receiver as claimed in claim 1, further comprising notifying means responsive to said alert signal for notifying the user of a call.

8. A radio paging receiver as claimed in claim 1, wherein said decoding means comprises means for supplying power to said receiving means and said notifying means at different timings.

9. A radio paging receiver comprising a radio section for receiving and demodulating a paging signal, which is supposed to be a digital radio signal, containing a call number signal and a message signal;
   a memory for storing in advance the call number of the radio paging receiver;
   a decoder for decoding said paging signal which has been demodulated and supplying the decoded message signal and a signal notifying the call when the decoded call number signal is found identical with said call number of the receiver;
   a display unit for displaying message data;
   a signal processor for driving said display unit;
   a CPU for detecting and correcting errors in said message signal, thereby preparing said message data, and supplying said message data to said signal processor;
   sound notifying means for notifying the call with audible sounds;
   a first DC—DC converter for supplying power to said decoder; and
   a second DC—DC converter, starting operation when said decoder outputs said message signal, for supplying power to said CPU.

10. A radio paging receiver, as claimed in claim 9, further including a pulse shaping circuit, connected between said radio section and said decoder, for pulse-shaping said paging signal which has been demodulated and supplying the demodulated paging signal to said decoder.

11. A radio paging receiver, as claimed in claim 9, wherein said display unit includes liquid crystal display (LCD) means.

12. A radio paging receiver, as claimed in claim 10, further including a battery for supplying power to said radio section, said pulse shaping circuit and said sound notifying means.

13. A radio paging receiver, as claimed in claim 9, wherein said second DC—DC converter supplies power to said decoder.

14. A radio paging receiver, as claimed in claim 12, wherein said battery supplies power to said first and second DC—DC converters.

15. A radio paging receiver comprising means for receiving and demodulating a paging signal, which is supposed to be a digital radio signal, containing a call number signal and a message signal;
   means for notifying the call when the decoder call number signal is found identical with the call number of the receiver stored in advance;
   means for processing the decoded message signal;
   means for displaying the message obtained from said processing means;
   a first DC—DC converter for supplying power to said notifying means; and
   a second DC—DC converter, operating for a shorter period than said first DC—DC converter, for generating an output voltage different from that of said first DC—DC converter to supply said output voltage to said processing means.

16. A radio paging receiver, as claimed in claim 15, wherein said first DC—DC converter operates only while the power switch is on.

17. A radio paging receiver, as claimed in claim 16, wherein said first DC—DC converter supplies power to said processing means.

18. A radio paging receiver, as claimed in claim 15, wherein said second DC—DC converter operates in the message display mode including the sound mode and in the message data processing mode.

19. A radio paging receiver, as claimed in claim 18, wherein said second DC—DC converter is instructed by said decoding means to come on when said message data processing mode is started.

20. A radio paging receiver, as claimed in claim 15, wherein said processing means has a CPU, to which said decoded message signal is inputted, for preparing message data from said message signal, and a signal processor for processing the message data from said CPU and so driving said display means as to display the processed message data, and said second DC—DC converter supplies power to said CPU and said signal processor in the message data processing mode and the message display mode.

21. A radio paging receiver, as claimed in claim 15, further including an amplifier for amplifying the signal notifying the call, and supplying the amplified signal to a loud speaker.

22. A radio paging receiver, as claimed in claim 21, wherein said amplifier receives power supply from a battery.

23. A radio paging receiver comprising a radio section for receiving and demodulating a paging signal, which is supposed to be a digital radio signal, containing a call number signal and a message signal;
   a programmable read only memory (PROM) for storing in advance the call number of the radio paging receiver;
   a decoder for decoding said paging signal which has been demodulated and supplying the decoded message signal when the decoded call number signal is found identical with said call number of the receiver;
   an LCD unit for displaying message data;
   an LCD signal processor for driving said LCD unit;
   a CPU for detecting and correcting errors in said message signal, thereby preparing said message data, and supplying said message data to said LCD signal processor;
   sound notifying means for notifying said call with audible sounds;

a first DC—DC converter for supplying power to said decoder; and a second DC—DC converter, operating intermittently, for supplying power to said LCD signal processor and said CPU when said second DC—DC converter is operating.

24. A radio paging receiver comprising means for receiving and demodulating a paging signal, which is supposed to be a digital radio signal, containing a call number signal and a message signal;

means for notifying the call when the call number signal which has been decoded is found identical with the call number of the receiver stored in advance;

decoding means for decoding said message signal to a decoder signal;

means for displaying the message obtained from said decoded signals;

a constantly operating first DC—DC converter for constantly supplying a DC output to said receiving and said demodulating means; and a second DC—DC converter operating intermittently and, when it does operate, operating in parallel with said first DC—DC converter to supply a DC output to said decoding means.

25. A radio paging receiver, as claimed in claim 1, further including a third DC—DC converter whose input is supplied from said first and second DC—DC converters and which operates simultaneously with said second DC—DC converter.

26. A radio paging receiver, as claimed in claim 24, wherein said first DC—DC converter operates only while the power switch is on.

27. A radio paging receiver, as claimed in claim 25, wherein said second and third DC—DC converters operate in the message display mode including the sound mode and in the message data processing mode.

28. A radio paging receiver, as claimed in claim 25, wherein said second and third DC—DC converters are instructed to come on when said message data processing mode is started.

29. A radio paging receiver, as claimed in claim 25, wherein a current limiting circuit for limiting the input current to said third DC—DC converter is provided between the outputs of said first and second DC—DC converters and the input of said third DC—DC converter.

30. A radio paging receiver comprising a radio section for receiving and demodulating a paging signal, which is supposed to be a digital radio signal, containing a call number signal and a message signal;

a PROM for storing in advance the call number of the radio paging receiver;

a decoder for decoding said paging signal which has been demodulated and supplying the decoded message signal when the decoded call number signal is found identical with said call number of the receiver;

a CPU for detecting and correcting errors in said message signal, thereby preparing said message data, and supplying said message data;

a display unit for displaying a message;

sound notifying means for notifying the call with audible sounds;

a signal processor having a signal processor unit for processing said message data and a display driver for driving said display unit to have said message displayed on said display unit according to the processed message data;

a first DC—DC converter for supplying power to said decoder, said CPU, and said signal processor;

a second DC—DC converter operating intermittently and, when it does operate, operating in parallel with said first DC—DC converter to supply power to said CPU and said signal processor; and a third DC—DC converter whose input is supplied from said first and second DC—DC converters and which operates simultaneously with said second DC—DC converter to supply power to said display driver.

31. A radio paging receiver, as claimed in claim 30, wherein said first and second DC—DC converters supply power to said decoder, said CPU and said signal processor in the message data processing mode and the message display mode.

32. A radio paging receiver, as claimed in claim 30, wherein said third DC—DC converter supplies power to said driver within said signal processor in the message display mode.

33. A radio paging receiver, as claimed in claim 30, wherein said sound notifying means has a loud speaker and an amplifier.

34. A radio paging receiver as claimed in claim 33, further including a battery for supplying power to said radio section and said amplifier.

35. A radio paging receiver, as claimed in claim 30, further including a pulse shaping circuit, connected between said radio section and said decoder, for pulse-shaping said paging signal which has been demodulated and supplying the demodulated paging signal.

36. A radio paging receiver, as claimed in claim 30, wherein said first DC—DC converter operates throughout the period in which the power switch is on, and supplies power to said sound decoding means and said notifying means.

37. A radio paging receiver, as claimed in claim 30, wherein said second DC—DC converter operates only in the message display mode and the message data processing mode, and supplies its output to said control means and said sound notifying means.

38. A radio paging receiver, as claimed in claim 36, wherein said first DC—DC converter supplies power to said control means in the message display mode and the message data processing mode.

39. A radio paging receiver, as claimed in claim 38, wherein said second DC—DC converter is instructed by said sound notifying means to come on when said message data processing mode is started, and is instructed by said sound notifying means to come off when said message display mode ends.

40. A radio paging receiver as claimed in claim 38, wherein said control means includes a decoder for supplying a message signal resulting from the decoding of said paging signal, a CPU for preparing message data from said message signal, and a signal processor for processing the message data from said CPU and driving said display means, and said first and second DC—DC converters supply power to said CPU in the message data processing mode and the message display mode, and to said signal processor in said message display mode.

41. A radio paging receiver, as claimed in claim 6, wherein the output voltage of said second DC—DC converter is higher than that of said fidst DC—DC converter.

42. A radio paging receiver, as claimed in claim 40, wherein the output voltages of said first and second DC—DC converts are equal to each other.

43. A radio paging receiver as claimed in claim 7, wherein said notifying means comprises means responsive to said alert signal for generating an audible alert tone.

* * * * *